United States Patent
Ji et al.

(10) Patent No.: US 9,735,444 B2
(45) Date of Patent: Aug. 15, 2017

(54) HARD CARBON COMPOSITE FOR ALKALI METAL-ION BATTERIES

(71) Applicants: Oregon State University, Corvallis, OR (US); Sharp Laboratories of America, Inc., Camas, WA (US)

(72) Inventors: Xiulei Ji, Corvallis, OR (US); Wei Luo, Corvallis, OR (US); Clement Bommier, Corvallis, OR (US); Yuhao Lu, Vancouver, WA (US); Sean Vail, Vancouver, WA (US); Jong-Jan Lee, Camas, WA (US)

(73) Assignees: Oregon State University, Corvallis, OR (US); Sharp Laboratories of America, Camas, WA (US)

( * ) Notice: Subject to any disclaimer, the term of this patent is extended or adjusted under 35 U.S.C. 154(b) by 228 days.

(21) Appl. No.: 14/731,667

(22) Filed: Jun. 5, 2015

(65) Prior Publication Data
US 2015/0270547 A1    Sep. 24, 2015

Related U.S. Application Data

(63) Continuation-in-part of application No. 14/271,498, filed on May 7, 2014, now Pat. No. 9,419,278, which
(Continued)

(51) Int. Cl.
*H01M 4/04* (2006.01)
*H01M 4/583* (2010.01)
(Continued)

(52) U.S. Cl.
CPC ..... *H01M 10/0525* (2013.01); *C01B 31/0476* (2013.01); *C01B 31/0484* (2013.01);
(Continued)

(58) Field of Classification Search
CPC ...... H01M 4/133; H01M 4/364; H01M 4/587; H01M 4/622; H01M 4/625;
(Continued)

(56) References Cited

U.S. PATENT DOCUMENTS

| 5,028,500 A | 7/1991 | Fong et al. |
| 6,143,268 A | 11/2000 | Dahn et al. |

(Continued)

OTHER PUBLICATIONS

V. L. Chevrier and G. Ceder, "Challenges for Na-ion Negative Electrodes" Journal of the Electrochemical Society 2011, 158, A1011-A1014.
(Continued)

*Primary Examiner* — Brittany Raymond
(74) *Attorney, Agent, or Firm* — Law Office of Gerald Maliszewski; Gerald Maliszewski (57) ABSTRACT

A method is provided for fabricating a graphene-doped, carbohydrate-derived hard carbon (G-HC) composite material for alkali metal-ion batteries. The method provides graphene oxide (GO) dispersed in an aqueous solution. A carbohydrate is dissolved into the aqueous solution and subsequently the water is removed to create a precipitate. In one aspect, the carbohydrate is sucrose. The precipitate is dehydrated and exposed to a thermal treatment of less than 1200 degrees C. to carbonize the carbohydrate. The result is the formation of a graphene-doped, carbohydrate-derived hard carbon (G-HC) composite. Typically, the G-HC composite is made up of graphene in the range of 0.1 and 20% by weight (wt %), and HC in the range of 80 to 99.9 wt %. The G-HC composite has a specific surface area of less than 10 square meters per gram ($m^2/g$). A G-HC composite suitable for use in alkali metal-ion batteries electrodes is also provided.

20 Claims, 7 Drawing Sheets

Related U.S. Application Data is a continuation-in-part of application No. 14/230,882, filed on Mar. 31, 2014, now Pat. No. 9,634,317, which is a continuation-in-part of application No. 14/198,755, filed on Mar. 6, 2014, now Pat. No. 9,660,241, which is a continuation-in-part of application No. 14/198,702, filed on Mar. 6, 2014, now Pat. No. 9,583,751, which is a continuation-in-part of application No. 14/198,663, filed on Mar. 6, 2014, now Pat. No. 9,537,131, which is a continuation-in-part of application No. 14/193,782, filed on Feb. 28, 2014, now Pat. No. 9,627,671, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, now Pat. No. 9,559,358, which is a continuation-in-part of application No. 13/432,993, filed on Mar. 28, 2012, now Pat. No. 9,269,953.

(60) Provisional application No. 62/009,069, filed on Jun. 6, 2014.

(51) Int. Cl.
| | | |
|---|---|---|
| *H01M 4/62* | (2006.01) | |
| *H01M 10/0525* | (2010.01) | |
| *H01M 4/133* | (2010.01) | |
| *H01M 4/36* | (2006.01) | |
| *H01M 4/587* | (2010.01) | |
| *C01B 31/04* | (2006.01) | |
| *H01M 10/054* | (2010.01) | |

(52) U.S. Cl.
CPC .......... *H01M 4/133* (2013.01); *H01M 4/364* (2013.01); *H01M 4/587* (2013.01); *H01M 4/622* (2013.01); *H01M 4/625* (2013.01); *H01M 10/054* (2013.01); *Y10T 29/49108* (2015.01)

(58) Field of Classification Search
CPC ........... H01M 10/0525; H01M 10/054; Y10T 29/49108; C01B 31/0476; C01B 31/0484
See application file for complete search history.

(56) References Cited

U.S. PATENT DOCUMENTS

| | | |
|---|---|---|
| 8,388,922 B2 | 3/2013 | Sotowa et al. |
| 2010/0298522 A1 | 11/2010 | Suzuki et al. |
| 2012/0230907 A1 | 9/2012 | Kurakane et al. |

OTHER PUBLICATIONS

L. Xiao et al., "High Capacity, Reversible Alloying Reactions in SnSb/C Nanocomposites for Na-ion Battery Applications", Chemical Communications 2012, 48, 3321-3323.

Q. Sun, Q.-Q. Ren, H. Li, and Z-W. Fu, "High Capacity Sb2O4 Thin Film Electrodes for Rechargeable Sodium Battery", Electrochemistry Communications 2011, 13, 1462-1464.

Y. Kuroda, E. Kobayashi, S. Okada, and J-i. Yamaki, "Electrochemical Properties of Spinel-type Oxide Anodes in Sodium-lon Battery", 218th ECS Meeting, Abstract# 389.

R. Alcántara et al., "NiCo2O4 Spinel: First Report on a Transition Metal Oxide for the Negative Electrode of Sodium-Ion Batteries", Chemistry of Materials 2002, 14, 2847-2848.

J-S. Kim et al., "The Addition of Iron to Ni3S2 Electrode for Sodium Secondary Battery", Current Applied Physics 2011, 11, S215-218.

M. M. Doeff, Y. Ma, S. J. Visco, and L. C. De Jonghe, "Electrochemical Insertion of Sodium into Carbon", Journal of the Electrochemical Society 1993, 140, L169-L170.

X. Xia and J. R. Dahn, "Study of the Reactivity of Na/Hard Carbon with Different Solvents and Electrolytes", Journal of the Electrochemical Society 2012, 159, A515-A519.

W. Xing and J. R. Dahn, "Study of Irreversible Capacities for Li Insertion in Hard and Graphitic Carbons", Journal of the Electrochemical Society 1997, 144, 1195-1201.

E. Buiel et al., "Reduction of the Irreversible Capacity in Hard-Carbon Anode Materials Prepared from Sucrose . . . ", Journal of the Electrochemical Society 1998, 145,1977-1981.

E. Buiel et al., "On the Reduction of Lithium Insertion Capacity in Hard-Carbon Anode Materials with . . . ", Journal of the Electrochemical Society 1998, 145, 2252-2257.

HARD CARBON COMPOSITE FOR ALKALI METAL-ION BATTERIES

RELATED APPLICATIONS

This application claims the benefit of a Provisional application entitled, HARD CARBON COMPOSITE FOR ALKALI METAL-ION BATTERIES, invented by Xiulei Ji et al, Ser. No. 62/009,069, filed Jun. 6, 2014.

This application is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, now U.S. Pat. No. 8,957,796, issued on Feb. 17, 2015;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012.

All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a graphene-doped, carbohydrate-derived hard carbon (G-HC) composite and associated synthesis method, for use as an electrode in an alkali metal-ion battery.

2. Description of the Related Art

Modern rechargeable lithium battery technology has triggered the portable electronics revolution owing to high power density and long cycle life. The secondary lithium battery consists of a cathode (positive electrode) and anode (negative electrode), separated by a lithium ion ($Li^+$)-permeable membrane. A solution or polymer rich in lithium ions is employed to permit the facile (readily occurring) migration of lithium ions between the positive and negative electrodes. Common positive materials include transition metal oxides such as lithium cobalt oxide ($LiCoO_2$), lithium manganese oxide ($LiMn_2O_4$) and lithium iron phosphate ($LiFePO_4$), among others. $Li^+$ can travel within the interstitial space(s) of these materials both freely and reversibly. In general, metallic lithium, alloys, and carbonaceous materials can be utilized as the negative electrode. When the rechargeable lithium battery does not include a metallic electrode, it is referred to as lithium-ion battery (LIB).

During the discharge process in a lithium-ion battery, lithium ions are extracted from the negative electrode and subsequently inserted into the positive electrode. At the same time, electrons pass through an external circuit from the negative electrode to the positive electrode to generate electric power. During the charge process, ions and electrons move along the reverse directions and are ultimately restored to their original locations.

Despite the fact that LIBs have been employed successfully over a broad range of commercial applications, the issue of lithium supply, as it applies to both the strain on natural reserves and potential fluctuations in price, has motivated the development of a low-cost, rechargeable battery technology as an alternative to LIB. In light of this, sodium-ion batteries (NIBs) have increased in popularity due primarily to the fact that sodium has similar properties to lithium, but also boasts the benefits of both a potentially lower cost and virtually unlimited availability.

Although metallic sodium (Na) would make an ideal anode choice for sodium battery, its practical application is severely limited by safety concerns including reactivity, flammability, formation of dendritic structures during charge/discharge, and low melting point (<100° C.). In light of these potential hazards, non-sodium metal anodes appear to be more viable options for sodium battery applications. Currently, three main classes of materials have emerged as promising candidates for non-sodium metal anodes including: (1) metals (alloys with Na), (2) metal chalcogenides (metal oxides and sulfides), and (3) carbonaceous materials.

According to calculations, tin (Sn) and lead (Pb) can alloy 3.75 Na atoms, which correspond to capacities of 847 milliamp hours per gram (mAh/g) and 485 mAh/g for Sn and Pb, respectively [1]. Xiao et al. described a Sn/antimony (Sb) alloy demonstrating a reversible capacity of 544 mAh/g with 80% capacity retention after 50 cycles [2]. Overall, although it has been shown that Sn, Sb, and Pb provide high capacity anodes upon alloy formation with Na, large volume changes associated with the alloying process deteriorate the electrode integrity, and ultimately degrade battery performance.

Sun et al. reported a thin film antimony tetroxide ($Sb_2O_4$) anode for NIB that exhibited a large reversible capacity (896 mAh/g) originating from alloying/dealloying and oxidation/reduction processes of Sb [3]. Spinel materials such as Cobalt(II,III) oxide ($Co_3O_4$) and lithium titanate ($Li_4Ti_5O_{12}$) showed similar behaviors [4]. These materials provided discharge and charge voltages of ~0.5 V and ~1.0 V, respectively, in half cell configurations with Na metal counter electrodes. Furthermore, the reversible capacities were ~350 mAh/g for $Co_3O_4$ and ~100 mAh/g for $Li_4Ti_5O_{12}$. Nickel cobaltite ($NiCo_2O_4$) was shown to react with sodium ions ($Na^+$) from 1.2 V to 0 V (vs $Na/Na^+$), which were removed between 0.3 V and 1.5 V (vs $Na/Na^+$) and for which a reversible capacity ~200 mAh/g was demonstrated [5]. As an alternative to metal oxides, nickel sulfide ($Ni_3S_2$) was explored as a potential candidate for NIB anodes, for which discharge from ~1.1 V to 0.3 V and charge from 1 V to 1.8 V (vs $Na/Na^+$) with a reversible capacity ~250 mAh/g was shown [6].

In general, carbonaceous materials consist of three allotropes including diamond, graphite, and buckminsterfullerene. Within the context of metal-ion batteries, only graphite and its disordered forms qualify as practical anode materials. Graphite features a typical layered structure into/from which lithium ions ($Li^+$) can reversibly intercalate/de-intercalate. Unfortunately, larger $Na^+$ (and potassium ions, $K^+$) species do not readily insert into the layered structure as evident by low corresponding capacities. However, upon the action of specific treatments, carbonaceous materials can be rendered as amorphous. Based upon their respective crystallinities, amorphous carbons may be further classified as "soft" (graphitizable) and "hard" (non-graphitizable) carbons.

In general, $Na^+$ intercalation into hard carbon (HC) is considered to be a two-step process consisting of: (1) $Na^+$ insertion between parallel layers of graphene (high voltage region), and (2) intercalation of Na into pores of HC (low voltage region). Although the characteristic properties of HC are favorable for NIB applications, the corresponding capacities are often too low to be practical. Within the context of NIB applications, the formation of a solid electrolyte interface (SEI) on the surface of HC during the first cycle ($Na^+$ ion insertion into HC) consumes a significant proportion of $Na^+$, which results in a high irreversible capacity. A comprehensive treatment of the reactivity of carbon materials towards $Li^+$ and $Na^+$ under various experimental parameters has been previously provided [7-11].

Currently, the preparation of "state-of-the-art" HC materials requires thermal anneal at temperatures exceeding 1400° C. in order to decrease the surface area, the latter of which is known to be beneficial in terms of reducing irreversible capacity (SEI formation). Although it has been reported that the specific surface area (SSA) of HC decreases with an increase in pyrolysis temperatures, such extreme processing temperatures will not only increase production costs, but also reduce the specific capacity of HC.

It would be advantageous if alternative processes existed for synthesizing a graphene-doped, carbohydrate-derived hard carbon (G-HC) at a low pyrolysis temperature, with a low specific surface area (SSA).

(1) V. L. Chevrier and G. Ceder, "Challenges for Na-ion Negative Electrodes", *Journal of the Electrochemical Society* 2011, 158, A1011-A1014.

(2) L. Xiao, Y. Cao, J. Xiao, W. Wang, L. Kovarik, Z. Nie, and J. Liu, "High Capacity, Reversible Alloying Reactions in SnSb/C Nanocomposites for Na-ion Battery Applications", *Chemical Communications* 2012, 48, 3321-3323.

(3) Q. Sun, Q-Q. Ren, H. Li, and Z-W. Fu, "High Capacity $Sb_2O4$ Thin Film Electrodes for Rechargeable Sodium Battery", *Electrochemistry Communications* 2011, 13, 1462-1464.

(4) Y. Kuroda, E. Kobayashi, S. Okada, and J-I. Yamaki, "Electrochemical Properties of Spinel-type Oxide Anodes in Sodium-Ion Battery", $218^{th}$ ECS Meeting, Abstract#389.

(5) R. Alcantara, M. Jaraba, P. Lavela, and J. L. Tirado, "$NiCo_2O_4$ Spinel: First Report on a Transition Metal Oxide for the Negative Electrode of Sodium-Ion Batteries", *Chemistry of Materials* 2002, 14, 2847-2848.

(6) J-S. Kim, G-B. Cho, K-W. Kim, J-H. Ahn, G. Wang, and H-J. Ahn, "The Addition of Iron to $Ni_3S_2$ Electrode for Sodium Secondary Battery", *Current Applied Physics* 2011, 11, S215-S218.

(7) M. M. Doeff, Y. Ma, S. J. Visco, and L. C. De Jonghe, "Electrochemical Insertion of Sodium into Carbon", *Journal of the Electrochemical Society* 1993, 140, L169-L170.

(8) X. Xia and J. R. Dahn, "Study of the Reactivity of Na/Hard Carbon with Different Solvents and Electrolytes", *Journal of the Electrochemical Society* 2012, 159, A515-A519.

(9) E. Buiel and J. R. Dahn, "Reduction of the Irreversible Capacity in Hard-Carbon Anode Materials Prepared from Sucrose for Li-Ion Batteries", *Journal of the Electrochemical Society* 1998, 145, 1977-1981.

(10) E. Buiel, A. E. George, and J. R. Dahn, "On the Reduction of Lithium Insertion Capacity in Hard-Carbon Anode Materials with Increasing Heat-Treatment Temperature", *Journal of the Electrochemical Society* 1998, 145, 2252-2257.

(11) W. Xing and J. R. Dahn, "Study of Irreversible Capacities for Li Insertion in Hard and Graphitic Carbons", *Journal of the Electrochemical Society* 1997, 144, 1195-1201.

SUMMARY OF THE INVENTION

As an alternative to existing high-temperature processes for synthesizing hard carbon (HC) for use in alkali metal-ion battery electrodes, a high performance graphene-HC composite derived from a carbohydrate can be realized in a straightforward manner by combining graphene oxide (GO) with a carbohydrate such as sucrose in aqueous solution, followed by thermal treatment under temperature conditions sufficient to carbonize the carbohydrate (sucrose). The resulting graphene-doped, carbohydrate (sucrose)-derived HC (G-HC) composite, subsequently annealed at a relatively low temperature (1100° C.), exhibits a low specific surface area (SSA) of 5.4 $m^2/g$ and, consequently, provides the benefit of a small irreversible capacity (17.2%). The synthesis, characterization, and electrochemical performance of low SSA graphene-HC composites are discussed in the following sections.

Conventionally, HC is prepared via pyrolysis of organic precursors in an inert atmosphere at temperatures ranging from 1000° C. to 1600° C. Although it has been reported that the specific surface area of HC decreases with an increase in pyrolysis temperatures, higher temperatures not only increase the cost of production, but also lead to a reduction in capacity. Therefore, it is highly desirable to identify both an efficient and cost-effective route to reduce SSA at a relatively low pyrolysis temperature (e.g., 1100° C.).

Graphene, a one atom-thick two-dimensional graphitic carbon material, has been widely explored due to its unique physical and chemical properties. Herein is described the synthesis of a graphene-doped, carbohydrate-derived hard carbon (G-HC) composite through the pyrolysis of a carbohydrate/graphene oxide (GO) composite at 1100° C. Noteworthy is the fact that the as-prepared G-HC composite features a low SSA (5.4 $m^2/g$). In sharp contrast, HC prepared without GO doping under the same thermal and environmental conditions yields a significantly higher SSA (137.2 $m^2/g$). More importantly, when employed as an electrode material in an alkali metal-ion battery, the irreversible capacity of G-HC composite (17.2%) is significantly smaller than that of pristine HC (26.9%).

Accordingly, a method is provided for fabricating a G-HC composite material for alkali metal-ion batteries. The method provides graphene oxide dispersed in an aqueous solution. A carbohydrate is dissolved into the aqueous solution and subsequently the water is removed to create a precipitate. In one aspect, the carbohydrate is sucrose. The precipitate is dehydrated and then exposed to a thermal treatment of less than 1200 degrees C. In response to the thermal treatment, the carbohydrate is carbonized. The result is the formation of a graphene-doped, carbohydrate-derived hard carbon (G-HC) composite. Typically, the G-HC composite is made up of graphene in the range of 0.1 and 20% by weight (wt %), and HC in the range of 80 to 99.9 wt %, although higher percentages of graphene in the G-HC composite may also be beneficial. The resultant G-HC composite has a specific surface area (SSA) of less than 10 square meters per gram ($m^2/g$).

Additional details of the above-described method and a battery electrode made from G-HC composite are presented below.

DETAILED DESCRIPTION

For the synthesis of graphene-doped, carbohydrate-derived (G-HC) composite materials, graphene oxide (GO) was synthesized from natural graphite flakes using a modified "Hummer's" method. Next, sucrose (2 grams) was dissolved into an aqueous dispersion of GO (25 milligrams (mg) GO dispersed in 75 milliliters (mL) $H_2O$) with sonication for 2 hours at room temperature. The sucrose/GO solution was subsequently dried at 80° C. for 24 hours to afford a brown precipitate. The obtained precipitate was further dehydrated in air at 180° C. for 24 hours, followed by a carbonization procedure (thermal treatment) performed in a tube furnace at 1100° C. for 6 hours under an argon (Ar) atmosphere.

Figure 1:
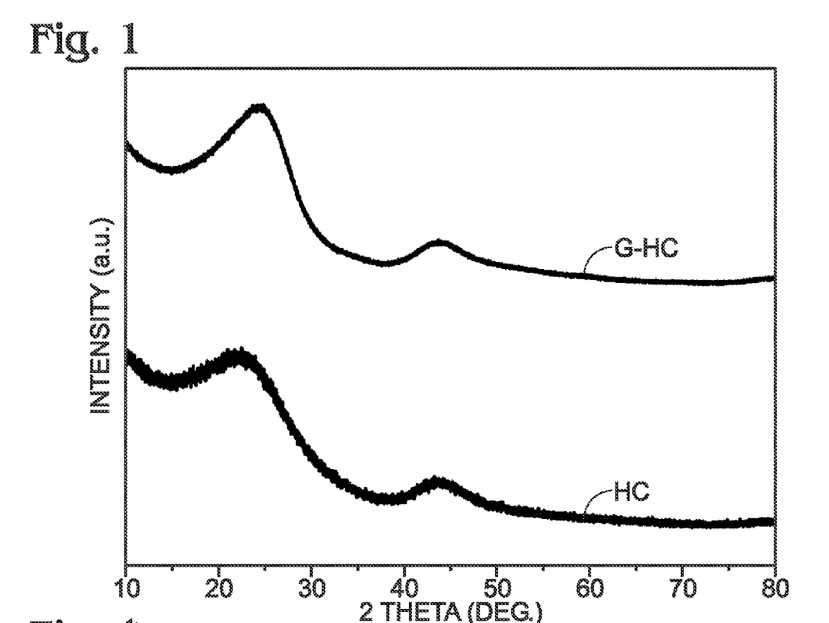
FIG. 1 is a plot depicting powder X-Ray Diffraction (XRD) patterns of hard carbon (HC) and G-HC composite.

FIG. 1 is a plot depicting powder X-Ray Diffraction (XRD) patterns of hard carbon (HC) and G-HC composite. In a control experiment, sucrose was directly dehydrated and carbonized under the identical conditions used for preparing G-HC composite. After the final carbonization step, powder XRD analysis showed that G-HC composite and HC exhibited similar HC structure characterized by two broad peaks at ~24° and 43°, which can be indexed to the (002) and (101) planes, respectively, as shown in the figure. In addition, field emission scanning electron microscope (FESEM) images showed that the G-HC composite and HC powders consisted of irregular particles with sizes ranging from 20 to 100 microns.

Figure 2A:
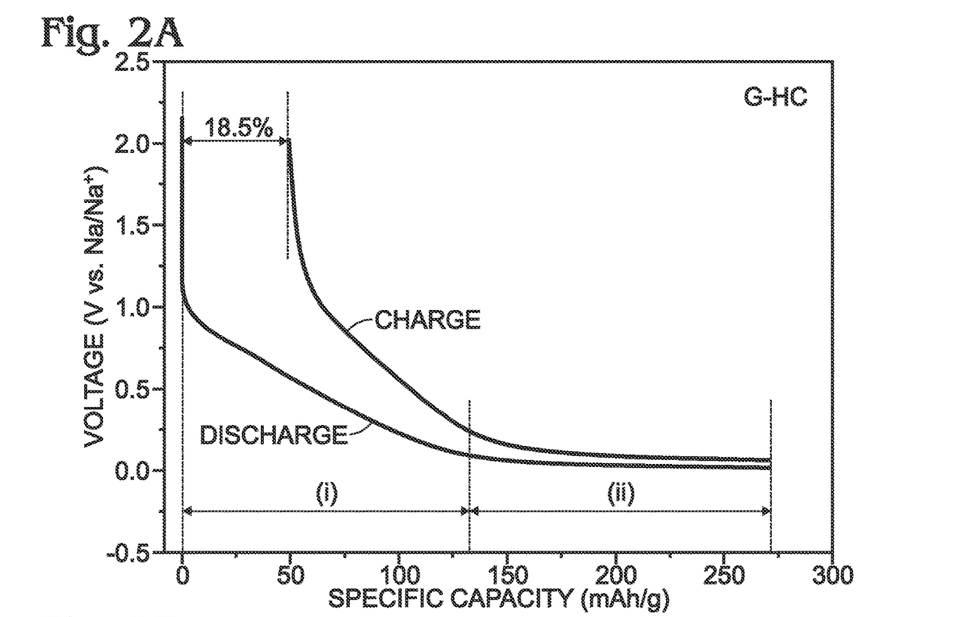
FIGS. 2A and 2B are potential-capacity profiles for G-HC composite and HC electrodes, respectively, cycled at a current density of 20 milliamps per gram (mA/g) in a potential range of 2.0 V to 0.01 V.
Figure 2B:
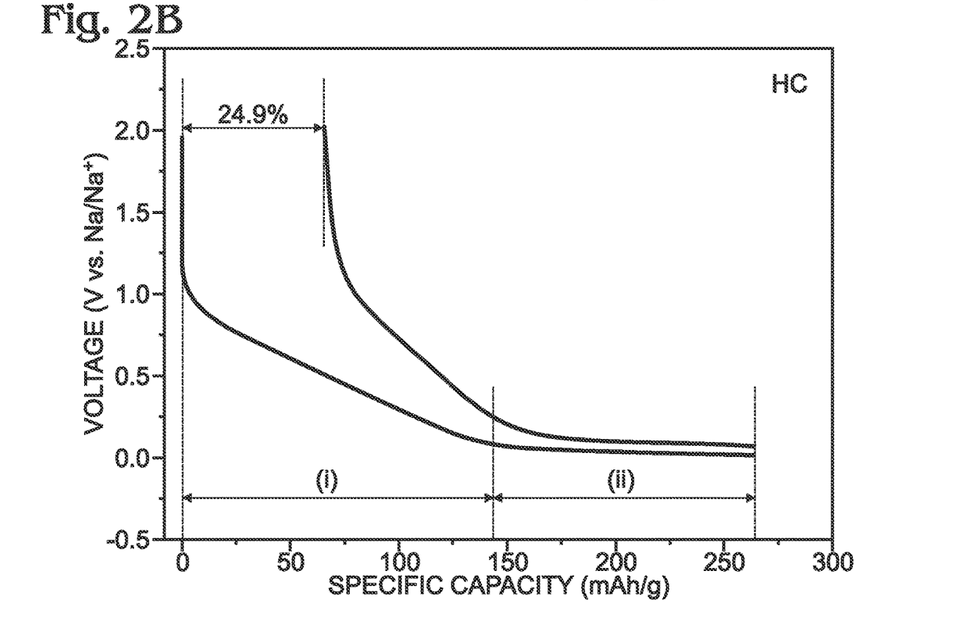

FIGS. 2A and 2B are potential-capacity profiles for G-HC composite and HC electrodes, respectively, cycled at a current density of 20 milliamps per gram (mA/g) in a potential range of 2.0 V to 0.01 V. For the investigation of sodium-ion ($Na^+$) storage properties, a test platform consisting of Na pellets (counter electrode), a glass fiber membrane (separator), and 1.0 mole per liter (mol/L or 1 M) sodium hexafluorophosphate ($NaPF_6$) in ethylene carbonate (EC)/diethyl carbonate (DEC) (1:1 by volume) as an electrolyte were assembled into coin cells in an argon-filled glovebox. A coin cell consists of a small metal canister that forms the body and positive terminal of a battery along with an insulated top cap that serves as the negative terminal. The working electrode consisted of G-HC composite or HC (93 percent by weight (wt %)) and polyvinylidene fluoride (PVDF, 7 wt %) as a binder. A typical mass loading of G-HC composite or HC on the current collector (aluminum (Al) foil) was ~2.5 milligrams per square centimeter ($mg/cm^2$). Initially, the cells were cycled at a low current density (20 mA/g) within a potential range of 2.0 V to 0.01 V. As shown in the figures, two distinct potential regions were observed in the potential-capacity profiles for the G-HC composite and HC electrodes. The slope in the first discharge curve from 1.0 to ~0.1 V corresponds to $Na^+$ insertion into turbostatic graphene inter-layers, as well as to the irreversible formation of solid electrolyte interface (SEI) layer, whereas the long plateau near 0 V is ascribed to $Na^+$ insertion into the nanopores of HC. The charge profiles correspond to the removal of $Na^+$ from HC. The overall discharge/charge capacities of G-HC composite and HC are 269/220 milliamp hours per gram (mAh/g) and 263/197 mAh/g, respectively. Taking into account the fact that the specific capacity difference between the first discharge and charge capacities corresponds to the irreversible capacity, it is evident that the irreversible capacity for G-HC composite is smaller than that of HC (18.5% vs. 24.9%).

Figure 3A:
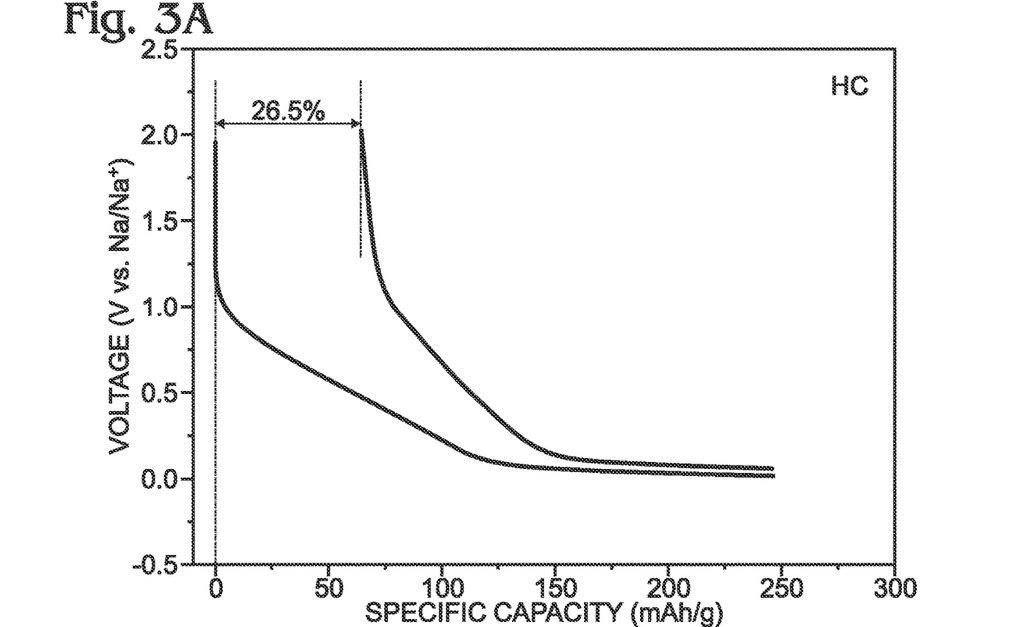
FIGS. 3A through 3D depict potential-capacity profiles for HC (FIGS. 3A and 3B) and G-HC composite (FIGS. 3C and 3D) electrodes cycled at a current density of 20 mA/g in a potential range of 2.0 V to 0.01 V.
Figure 3B:
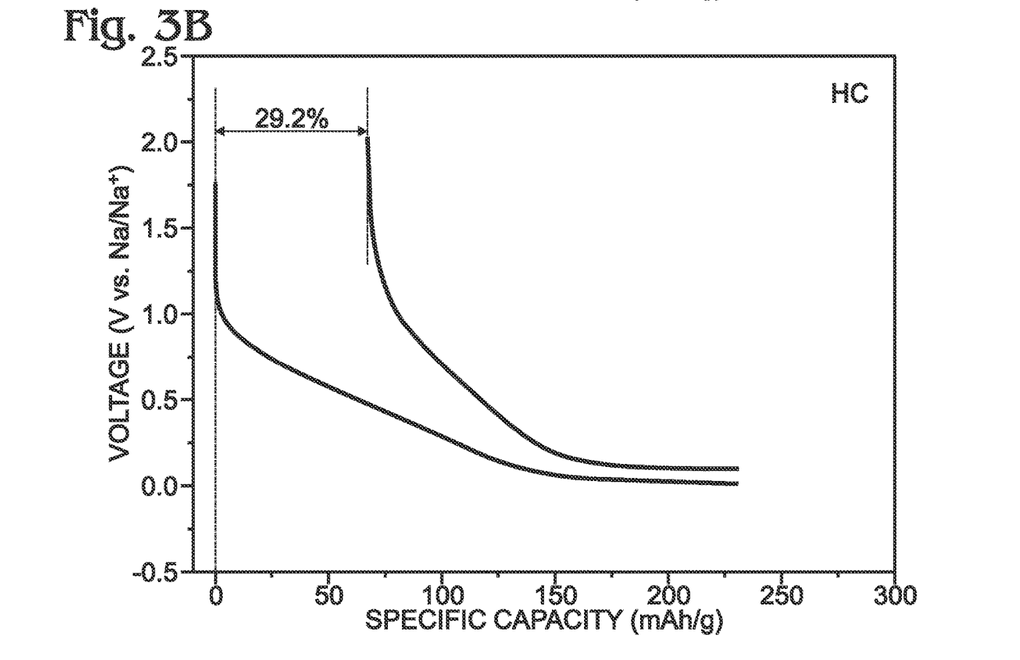
Figure 3C:
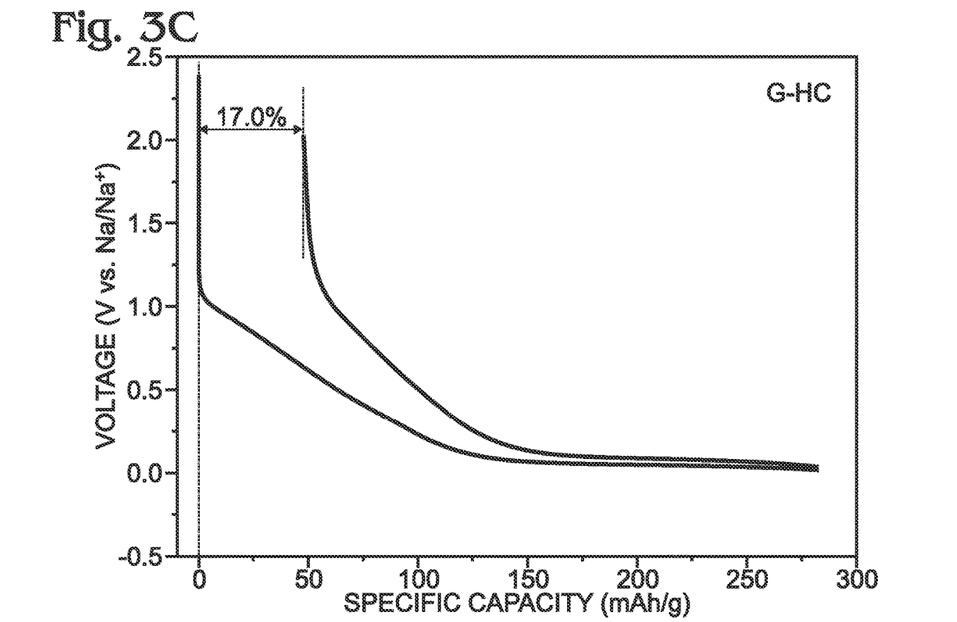
Figure 3D:
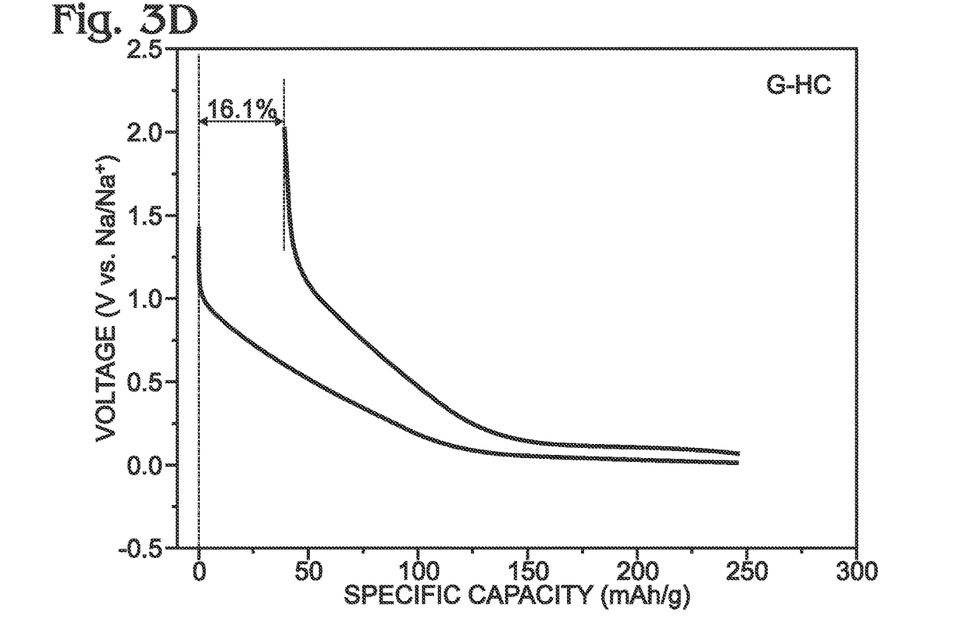

FIGS. 3A through 3D depict potential-capacity profiles for HC (FIGS. 3A and 3B) and G-HC composite (FIGS. 3C and 3D) electrodes cycled at a current density of 20 mA/g in a potential range of 2.0 V to 0.01 V. The experimental result described by FIGS. 2A and 2B was confirmed through additional cells evaluated in parallel, from which it can be concluded that G-HC composite demonstrates an average irreversible capacity of ~17.2% (FIGS. 2A, 3C, and 3D) compared to ~26.9% for HC (FIGS. 2B, 3A, and 3B). Furthermore, it is evident that the discharge capacity contribution (indicated by Part i in FIGS. 2A and 2B) from the slope region in HC is larger than that of G-HC composite, which is consistent with a larger irreversible capacity for HC arising from SEI formation.

Figure 4:
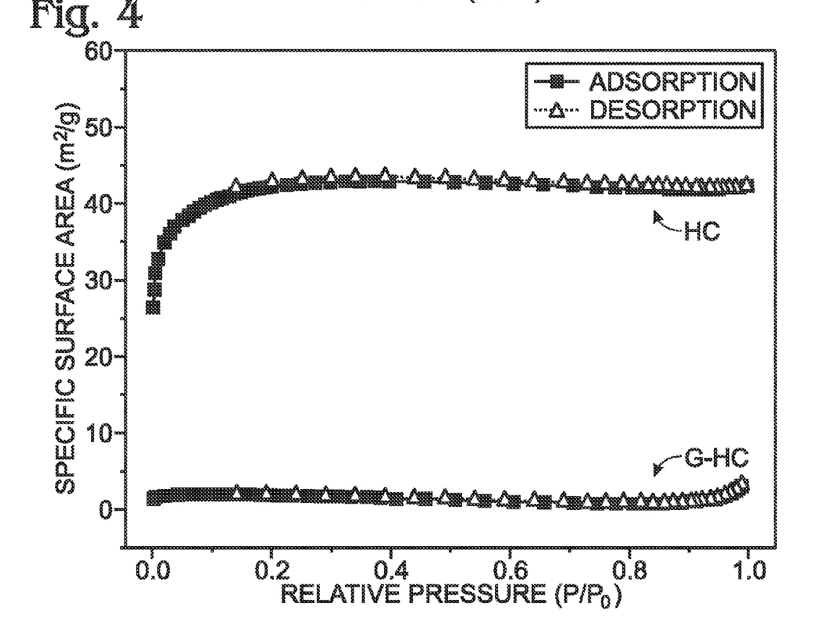
FIG. 4 is a plot depicting the nitrogen adsorption and desorption isotherms of HC and G-HC composite.

FIG. 4 is a plot depicting the nitrogen adsorption and desorption isotherms of HC and G-HC composite. According to previous technical reports, the enhanced reversible capacity of G-HC composite should be attributed, at least in part, to a smaller specific surface area (SSA). Therefore, $N_2$ adsorption/desorption measurements were carried out for the purposes of determining the porosity of G-HC composite and HC materials. As shown in the figure, G-HC composite and HC show distinct isotherms. In particular, whereas HC exhibits a porous structure, G-HC composite shows the properties of a dense material. The corresponding Brunauer-Emmett-Teller (BET) SSAs of G-HC composite and HC were determined as 5.4 $m^2/g$ and 137.2 $m^2/g$, respectively. Upon careful inspection during synthesis, it was observed that pure sucrose transformed into a "foamed" caramel (visually) following the dehydration process, whereas the sucrose/GO composite maintained its dense morphology under identical dehydration processing. A plausible reaction mechanism involves the formation of a large number of pores after removal of water in the sucrose, which arise as a consequence of bubbles produced by water vapor. In contrast, water can be effectively removed along GO sheets in the sucrose/GO composite, thereby preserving the dense structure. Following further thermal treatment (carbonization), HC prepared from dehydrated sucrose exhibits an abundance of pores. In contrast, the dehydrated sucrose/GO composite was transformed into graphene-doped HC featuring a low SSA.

Figure 5:
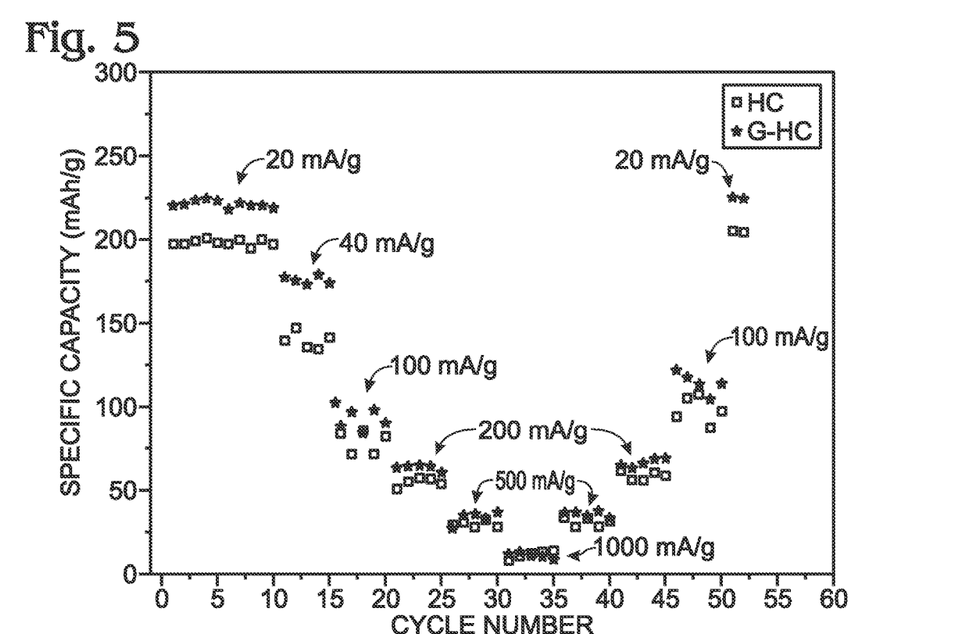
FIG. 5 is a graph depicting the charge capacities of G-HC composite and HC at various current densities (20 mA/g→40 mA/g→100 mA/g→200 mA/g→500 mA/g→1000 mA/g→500 mA/g→200 mA/g→100 mA/g→20 mA/g) in a potential range of 2.0 V to 0.01 V.

FIG. 5 is a graph depicting the charge capacities of G-HC composite and HC at various current densities (20 mA/g→40 mA/g→100 mA/g→200 mA/g→500 mA/g→1000 mA/g→500 mA/g→200 mA/g→100 mA/g→20 mA/g) in a potential range of 2.0 V to 0.01 V. Initially, both the HC and G-HC composite cells were cycled at a current density of 20 mA/g for 10 cycles. Under these conditions, HC and G-HC composite cells demonstrate average capacities corresponding to 198 mAh/g and 221 mAh/g, respectively. Upon increasing the current density to 40 mA/g, G-HC composite maintains a higher capacity (176 mAh/g) compared to HC (140 mAh/g). However, HC and G-HC composite demonstrate similar capacities after further increasing the current density (100 to 1000 mA/g). This observation is reasonable since rapid cycling benefits from a larger SSA to facilitate the rapid transport of $Na^+$ (insertion/desertion) between carbon matrix and electrolyte. Therefore, G-HC composite shows a lower rate performance compared to other (highly porous) carbons. Finally, the respective charge capacities can be restored to 225 mAh/g (G-HC composite) and 205 mAh/g (HC) upon reducing the current density back to 20 mA/g, which is indicative of stable cycling performance for HCs derived from sucrose.

Figure 6:
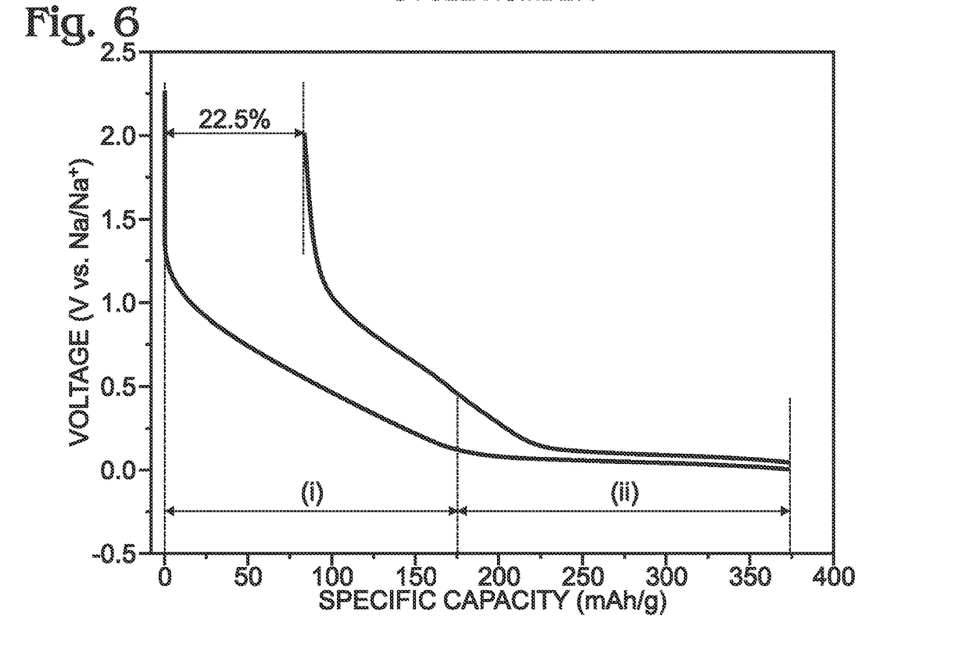
FIG. 6 is a plot depicting potential-capacity profiles for the G-HC composite electrode containing conductive carbon additive (10 wt %) cycled at a current density of 20 mA/g in a potential range of 2.0 V to 0.01 V.

FIG. 6 is a plot depicting potential-capacity profiles for the G-HC composite electrode containing conductive carbon additive (10 wt %) cycled at a current density of 20 mA/g in a potential range of 2.0 V to 0.01 V.

Figure 7:
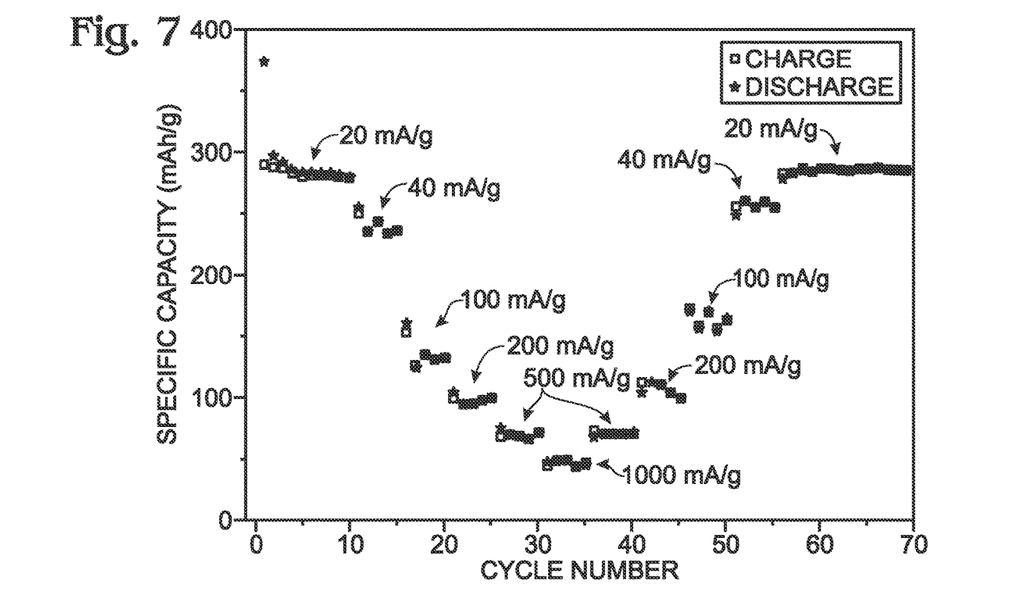
FIG. 7 is a plot depicting cycling and rate performance (charge/discharge capacities) for the G-HC composite electrode containing conductive carbon additive (10 wt %) cycles at various current densities (20 mA/g→40 mA/g→100 mA/g→200 mA/g→500 mA/g→1000 mA/g→500 mA/g→200 mA/g→100 mA/g→40 mA/g→20 mA/g) in a potential range of 2.0 V to 0.01 V.

FIG. 7 is a plot depicting cycling and rate performance (charge/discharge capacities) for the G-HC composite electrode containing conductive carbon additive (10 wt %) cycled at various current densities (20 mA/g→40 mA/g→100 mA/g→200 mA/g→500 mA/g→1000 mA/g→500 mA/g→200 mA/g→100 mA/g→40 mA/g→20 mA/g) in a potential range of 2.0 V to 0.01 V. In order to investigate the impact of conductive carbon additive on the behavior and rate performance of G-HC composite, carbon black (TIMCAL Super C45, 10 wt %) was included in the composition of the G-HC composite electrodes (G-HC composite:carbon black:PVDF=8:1:1). As evident in FIG. 6 for G-HC composite electrodes containing carbon black (10 wt %), the first discharge and charge capacities increase to 373 mAh/g and 295 mAh/g, respectively. Moreover, the rate performance is greatly enhanced and is characterized by excellent cycling stability (FIG. 7). Overall, the higher capacity and better rate performance (versus no conductive carbon additive) can be attributed to better conductivity owing to the inclusion of conductive carbon. At the same time, the irreversible capacity increases slightly to 22.5% (from 17.2% without conductive carbon), which is due to the higher SSA of the carbon black (45 $m^2/g$).

In summary, a facile approach for the synthesis of a HC composite material with low SSA (5.4 $m^2/g$) has been demonstrated through the introduction of GO into the sucrose solution prior to thermal treatment. Prototype cells employing this low SSA HC electrode achieve a low irreversible capacity (17.2%) and exhibit stable cycling performance. Upon addition of conductive carbon (10 wt %) into the electrode composition, both the capacity and rate performance can be significantly improved. Overall, the technology described herein provides a promising strategy for realizing cost-effective and large-scale production of HC featuring low SSA and low corresponding irreversible capacity. Moreover, the scope of the core synthesis protocol can be extended for the purposes of preparing additional graphene-doped carbon materials with low SSAs.

Graphene-HC composites can be employed as high performance anode materials in sodium-ion battery applications (and others). Technology advantages include (1) low irreversible capacity due to low SSA and (2) robust rate and cycle life performance.

Figure 8A:
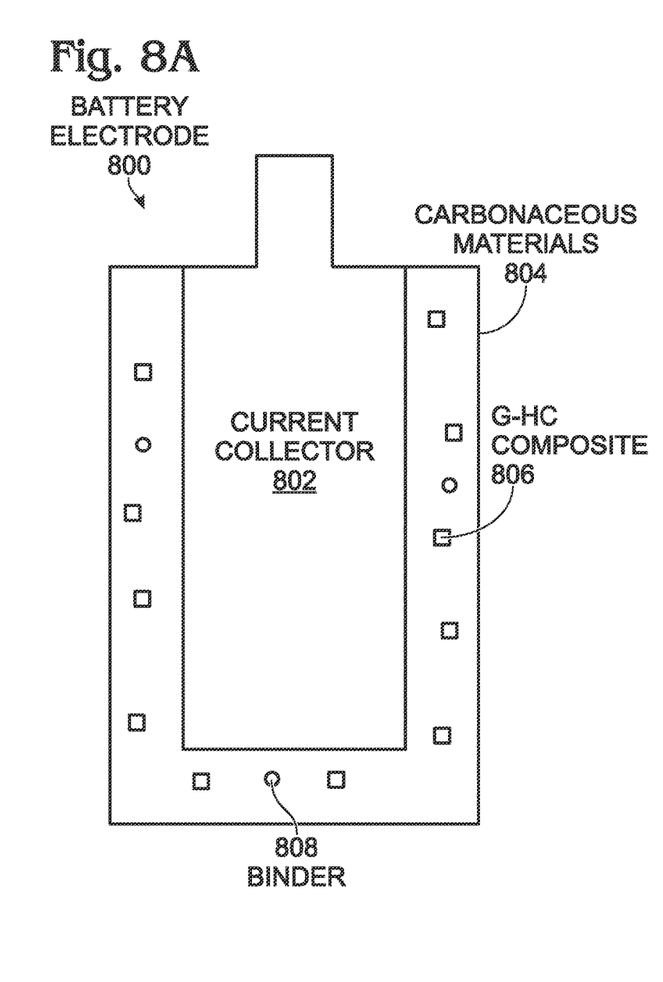
FIGS. 8A and 8B are partial cross-sectional views of a graphene-doped, carbohydrate-derived hard carbon composite battery electrode.
Figure 8B:
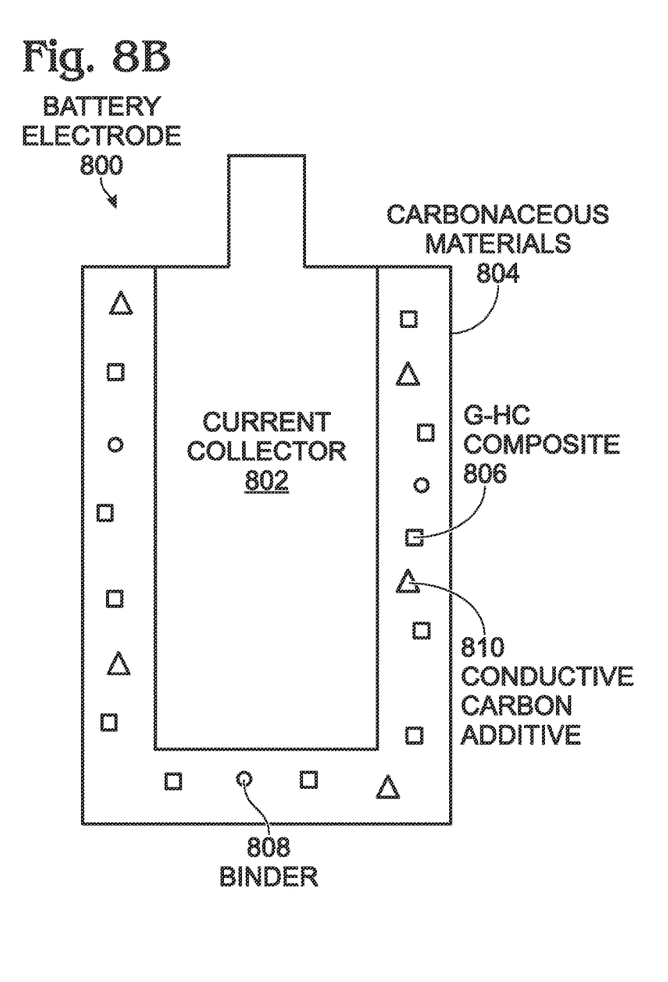

FIGS. 8A and 8B are partial cross-sectional views of a graphene-doped, carbohydrate-derived hard carbon composite battery electrode. The battery electrode 800 comprises a current collector 802, which is typically a highly conductive metal such as aluminum (Al) or copper (Cu). Carbonaceous materials 804 overlie the current collector 802 comprising a graphene-doped, carbohydrate-derived hard carbon (G-HC) composite, schematically represented as reference designator 806 and a binder material schematically represented as 808. Carbonaceous materials are materials rich in carbon. In one aspect, the G-HC composite 806 is a graphene-doped, sucrose-derived hard carbon. The G-HC composite 806 has a SSA of less than 10 square meters per gram ($m^2/g$).

Typically, the ratio of G-HC composite 806 to the total amount of carbonaceous materials 804 is in the range of 70 to 100% by weight (wt %). The ratio of binder material 808 to the carbonaceous materials 804 is in the range of 3 to 20 wt %. Some typical binder materials include polymers such as polyvinylidene fluoride (PVDF), polytetraflurorethylene (PTFE), sodium carboxymethyl cellulose (CMC), styrene butadiene rubber (SBR), etc. In general, the role of the binder, which is usually polymeric in nature, is to sequester the carbonaceous materials together and provide both form factor and mechanical integrity to the corresponding electrode.

In one aspect, as shown in FIG. 8B, the carbonaceous materials 804 further comprise a conductive carbon additive 810. Typically, conductive carbon additives are higher SSA materials employed for the purpose of improving the overall electrical conductivity of the electrode. The ratio of conductive carbon additive 810 in the carbonaceous materials 804 is in the range of 0 to 30 wt %.

Figure 9:
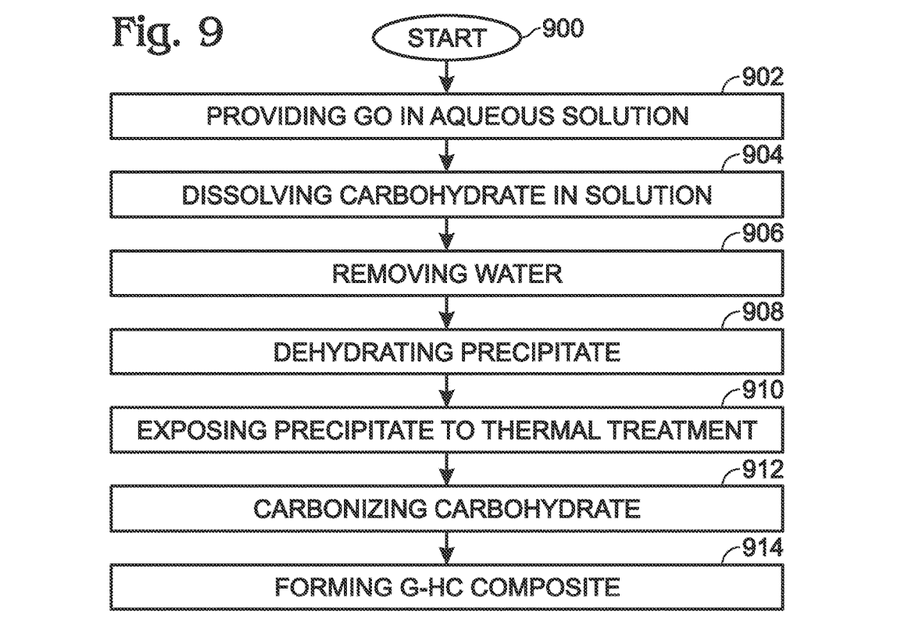
FIG. 9 is a flowchart illustrating a method for fabricating a graphene-doped, carbohydrate-derived composite material for alkali metal-ion batteries.

FIG. 9 is a flowchart illustrating a method for fabricating a graphene-doped, carbohydrate-derived composite material for alkali metal-ion batteries. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 900.

Step 902 provides graphene oxide (GO) dispersed in an aqueous solution. Step 904 dissolves a carbohydrate into the aqueous solution. A "carbohydrate" may be defined as a macromolecule that includes carbon, hydrogen, and oxygen atoms in its molecular structure. As used herein, a "carbohydrate" may be synonymous with "saccharides" including monosaccharides, disaccharides, oligosaccharides, and polysaccharides. In one aspect, the carbohydrate is sucrose. The process of creating a dispersion of GO in Step 902 may be aided with the use of sonication or stirring. Similarly, subsequent dissolution of the carbohydrate (e.g. sucrose) in Step 904 can be accomplished using stirring. Step 906 removes water to create a precipitate. For example, the water may be removed from the solution with the dispersed GO and dissolved carbohydrate by heating in an air atmosphere at a temperature of 100 degrees C. or less. Accordingly, residual water may still be present in the precipitate formed in Step 906. Step 908 dehydrates the precipitate. For example, in Step 908 the precipitate may be heated at a temperature of less than 250 degrees C., in an air environment.

Step 910 exposes the precipitate to a thermal treatment, typically at a temperature of less than 1200 degrees C. In one aspect, the thermal treatment is performed in an inert gas environment using a gas such as nitrogen or argon. In response to the thermal treatment, Step 912 carbonizes the carbohydrate. As used herein, "carbonization" is a thermal process through which an organic material or compound is converted into carbon or a carbon-containing residue, which may proceed via pyrolysis. As used herein, pyrolysis refers to a thermal treatment performed in the absence of oxygen. Due to an absence of an oxidant (oxygen), thermally-treated materials (including carbohydrates) decompose into combustible gases and carbonaceous materials. By definition, organic materials and compounds contain carbon atoms in their molecular structures and include carbohydrates. Step 914 forms a graphene-doped, carbohydrate-derived hard carbon (G-HC) composite. As used herein, a composite or composite material is composed of two or more components with different physical/chemical properties that, as a result of being combined, furnish a new material characterized by properties that are different than any of the original components. Typically, the G-HC composite comprises graphene in the range of 0.1 and 20 wt % and HC in the range of 80 to 99.9 wt %. In one aspect, the G-HC has a SSA of less than 10 $m^2/g$.

A graphene-doped, carbohydrate-derived hard carbon (G-HC) composite and associated fabrication process have been provided. Examples of particular materials and process details have been presented to illustrate the invention. However, the invention is not limited to merely these examples. Other variations and embodiments of the invention will occur to those skilled in the art.

We claim:

1. A method for fabricating a graphene-doped, carbohydrate-derived hard carbon composite material for alkali metal-ion batteries, the method comprising:
   providing graphene oxide (GO) dispersed in an aqueous solution;
   dissolving a carbohydrate into the aqueous solution;
   removing water to create a precipitate;
   dehydrating the precipitate;
   exposing the precipitate to a thermal treatment; and,
   forming a graphene-doped carbohydrate-derived hard carbon (G-HC) composite.

2. The method of claim 1 wherein forming the G-HC composite includes forming a G-HC composite comprising graphene in a range of 0.1 and 20% by weight (wt %) and HC in a range of 80 to 99.9 wt %.

3. The method of claim 1 further comprising:
   in response to the thermal treatment, carbonizing the carbohydrate.

4. The method of claim 1 wherein adding the carbohydrate to the aqueous solution includes adding sucrose to the aqueous solution.

5. The method of claim 1 wherein exposing the precipitate to the thermal treatment includes exposing the precipitate to a temperature of less than 1200 degrees Centigrade (C).

6. The method of claim 5 wherein exposing the precipitate to the thermal treatment includes performing the thermal treatment in an inert gas environment using a gas selected from a group consisting of nitrogen and argon.

7. The method of claim 1 wherein forming the G-HC composite includes the G-HC composite having a specific surface area (SSA) of less than 10 square meters per gram ($m^2/g$).

8. The method of claim 1 wherein dispersing the GO into the aqueous solution includes performing a process selected from a group consisting of sonication and stirring.

9. The method of claim 1 wherein dehydrating the precipitate includes heating at a temperature of less than 250 degrees C.

10. A graphene-doped, carbohydrate-derived hard carbon composite battery electrode, the battery electrode comprising:
a current collector;
carbonaceous materials overlying the current collector comprising:
a graphene-doped, carbohydrate-derived hard carbon (G-HC) composite; and,
a binder material.

11. The battery electrode of claim 10 wherein the ratio of G-HC composite to the carbonaceous materials is in a range of 70 to 100% by weight (wt %).

12. The battery electrode of claim 10 wherein the carbonaceous materials further comprise a conductive carbon additive.

13. The battery electrode of claim 12 wherein the ratio of conductive carbon additive in the carbonaceous materials is in a range of 0 to 30 wt %.

14. The battery electrode of claim 10 wherein the ratio of binder material to the carbonaceous materials is in a range of 3 to 20 wt %.

15. The battery electrode of claim 10 wherein the binder material includes a polymer.

16. The battery electrode of claim 10 wherein the G-HC composite is a graphene-doped, sucrose-derived hard carbon composite.

17. The battery electrode of claim 10 wherein the G-HC composite has a specific surface area (SSA) of less than 10 square meters per gram ($m^2/g$).

18. A composite material for use as an alkali metal-ion battery electrode, the composite material comprising:
graphene-doped, carbohydrate-derived hard carbon composite.

19. The composite material of claim 18 wherein the graphene-doped, carbohydrate-derived hard carbon composite is a graphene-doped sucrose-derived hard carbon composite.

20. The composite material of claim 18 wherein the G-HC composite has a specific surface area (SSA) of less than 10 square meters per gram ($m^2/g$).

* * * * *